United States Patent [19]

McGill et al.

[11] 4,183,428
[45] Jan. 15, 1980

[54] MOUNTING BAR AND GRIPPER JAW ASSEMBLY

[75] Inventors: Robert W. McGill, Munroe Falls; Michael E. Winiasz, Lorain, both of Ohio

[73] Assignee: A-T-O Inc., Willoughby, Ohio

[21] Appl. No.: 879,128

[22] Filed: Feb. 21, 1978

[51] Int. Cl.² .................. B65G 29/00; B65G 37/00; B65G 25/00

[52] U.S. Cl. .................. 198/479; 198/653; 198/695

[58] Field of Search .............. 198/479, 486, 488, 654, 198/653, 695, 458; 414/416; 214/1 BA, 309, 310

[56] References Cited

U.S. PATENT DOCUMENTS

| | | | |
|---|---|---|---|
| 2,611,493 | 9/1952 | Nordquist | 198/654 |
| 3,360,102 | 12/1967 | Cummings | 198/486 |
| 3,938,847 | 2/1976 | Peyton | 214/1 BA |
| 4,106,612 | 8/1978 | Koerner | 198/653 |
| 4,147,265 | 4/1979 | McGill | 198/479 |

Primary Examiner—Robert B. Reeves
Assistant Examiner—Brian M. Bond
Attorney, Agent, or Firm—Oldham, Oldham, Hudak & Weber Co.

[57] ABSTRACT

This invention relates to article casing and uncasing apparatus and especially to a mounting bar and gripper jaw assembly used for article engaging and transport action and including a bar adapted to extend transversely of a longitudinal axis of the apparatus and engage a driving means for movement through a fixed course and a plurality of gripper jaws are carried by each mounting bar. A pair of positioning members and connecting means therefor are provided for each gripper jaw means and the mounting bar operatively engages such members and positions them on opposite sides of a portion of the gripper jaw means with a connecting shaft extending therebetween. The mounting or carrier bar has an entrance and release opening in a bottom lateral portion thereof for such pair of members to permit engagement and disengagement of the gripper jaw means in relation to the mounting bar.

9 Claims, 4 Drawing Figures

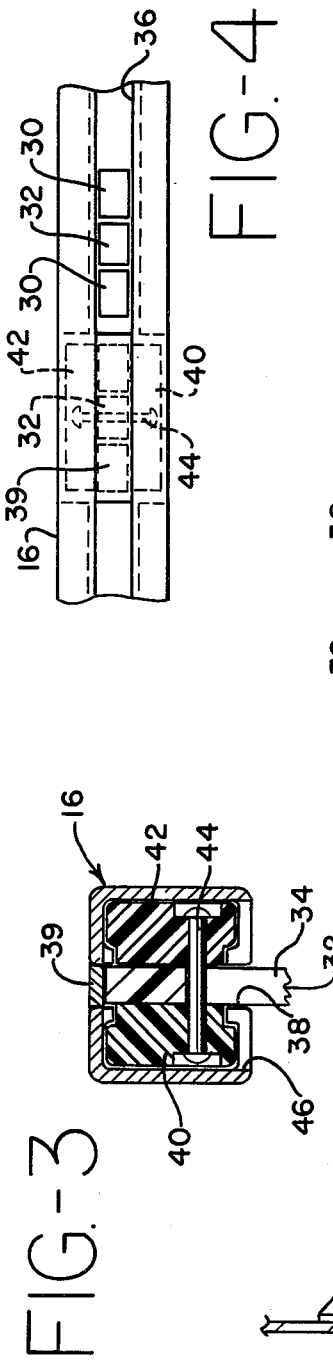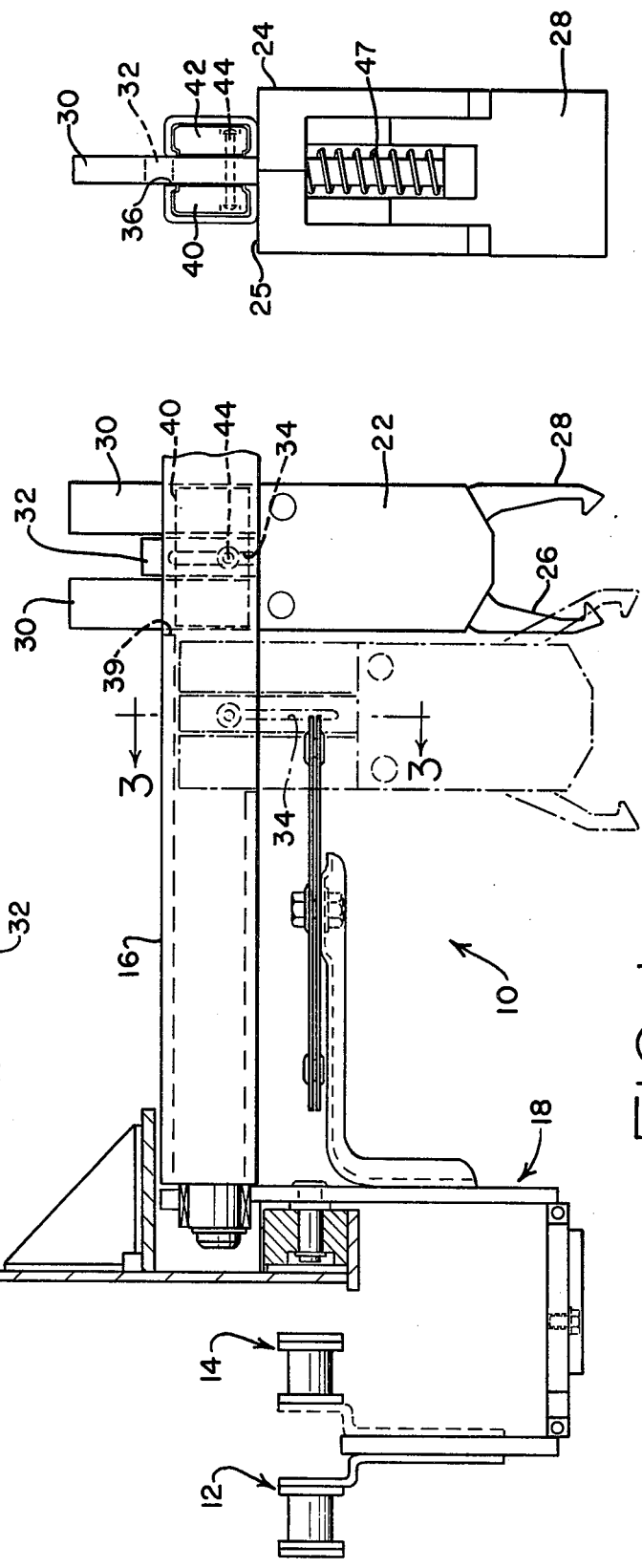

MOUNTING BAR AND GRIPPER JAW ASSEMBLY

BACKGROUND OF INVENTION

Heretofore there have been many different types of gripper jaw assemblies provided for engaging articles for transport in article or bottle processing apparatus. These gripper jaw assemblies, as used in the present invention, can be of any known types. However, there always are problems involved in positioning these gripper jaw assemblies properly for engaging with articles in a case so that the apparatus can remove the articles from the cases and transport them to a remote area.

One prior U.S. Pat. No. 3,951,285 shows laterally movable gripper jaws of one type.

In a companion application, U.S. Pat. No. 4,147,265, there has been provided apparatus that is adjustable in the manner of positioning gripper jaw carrier bars in the apparatus to adjust the apparatus easily and rapidly to variations in the numbers of articles in a given case being processed and/or to different spacing and relationships of the articles in the case, or to the number of spacing of transversely extending rows of articles to be processed. The number of articles in a case and the spacing and locations thereof in the case may vary widely. It has been somewhat difficult in apparatus as made heretofore to adjust the individual gripper jaw assemblies transversely of the case and position the gripper jaws in proper operative relationship with the articles to be engaged.

It is the general object of the present invention to position individual gripper jaw assemblies on carrier bars that are adapted for use in bottle and article processing apparatus including article uncaser apparatus so that the apparatus is readily adjustable to provide different lateral relationships between the individual gripper jaw means on the mounting bars positioning the same.

Another object of the invention is to provide complementary shapes for carrier bars in article processing apparatus and the mounting means for the individual gripper jaw means positioned on such carrier bars for convenient mounting and adjustment of the gripper jaw assemblies on the carrier bars.

Yet another object of the invention is to provide mechanical means including slides and/or rollers for operatively engaging gripper jaw assemblies and facilitating lateral movement thereof in the apparatus to adjust for variations in the types and sizes of cases being processed and the number of articles received therein.

Yet other objects of the invention are to provide a relatively inexpensive, but mechanically sturdy, apparatus requiring only a minimum of maintenance to provide adjustability in the positioning of gripper jaw assemblies in the apparatus; to permit ready assembly and/or disassembly of the gripper jaw means in the apparatus; to prevent accidental removal of individual gripper jaws from the carrier bars; and to require positive control of the gripper jaws to move them to a disassembly station.

The foregoing and other objects and advantages of the invention will be made more apparent as the specification proceeds.

Reference now is particularly directed to the accompanying drawings, wherein:

FIG. 1 is a fragmentary elevation of a gripper jaw means and carrier bar assembly embodying the principles of the invention and showing such apparatus in partial association with conveyor and drive means for the carrier bars and a partially diagrammatic view showing the lateral position adjustment of a gripper jaw assembly on the carrier bar;

FIG. 2 is a right side elevation, partially shown in vertical section, of the apparatus of FIG. 1;

FIG. 3 is a vertical section on line 3—3 of FIG. 1; and

FIG. 4 is a fragmentary plan of the carrier bar assembly of FIG. 1.

When referring to corresponding members shown in the drawings and referred to in the specification, corresponding numerals are used to facilitate comparison therebetween.

INVENTIVE SUBJECT MATTER

This invention, as one embodiment thereof, relates to a mounting assembly for gripper jaw means in article processing apparatus and wherein a driven means is present in the apparatus to be moved through a fixed longitudinally directed course and where a plurality of carrier bars are present and extend transversely of the longitudinal axis of the article processing apparatus for engaging the driven means to be moved through a fixed course, a plurality of gripper jaw means are operatively carried by and dependent from each of the carrier bars, a pair of positioning members are provided for each of the gripper jaw means and the carrier bar is contoured to and operatively engages and positions these members, a connecting shaft extends between such pairs of members and operatively engages an individual gripper jaw means, and the carrier bar has an entrance or release opening for such pair of members at a side bottom area thereof for assembly of or disassembly of the gripper jaw means in relation to the carrier bar.

With reference now to the details of the structure shown in the drawings, a mounting assembly for a gripper jaw is indicated as a whole by the numeral 10. This mounting assembly is particularly adapted for use with article processing apparatus including members such as driven conveyor means positioned for movement through a fixed course extending longitudinally of a bottle or article processing apparatus, usually a bottle uncaser adapted to pick up bottles from cases and remove them from the cases and deposit them at a remote spot for further processing. Thus, in the drawings, a pair of driving and positioning conveyors 12 and 14 are shown for engaging and moving members, particularly carrier or mounting bars 16 through a fixed course extending longitudinally of the apparatus. The details of these conveyors 12 and 14, and how they connect to the carrier bars as by means of a U-shaped bracket 18, and by other guide means to aid in controlling the carrier bar in relation to a frame 20 of the apparatus for movement through a fixed course thereon, are described in more detail in our co-pending application Ser. No. 895,815 filed 4/12/78.

An individual gripper jaw means 22 is indicated in the drawings and such gripper jaw means has a frame 24 with a pair or gripper jaws 26 and 28 pivotally positioned thereon for article engaging and transport action as desired. The positions of these gripper jaws, the construction of which is shown in more detail in co-pending application Ser. No. 845,460 filed Oct, 25, 1977 are normally controlled and biased to article engaging positions by spring 47 means. Control fingers 30 extend upwardly of the gripper jaw assemblies to control the article release action or to prepare for article engaging action of the gripper jaws 26 and 28. A control bar or rod 32 extends vertically upwardly of the gripper jaw assembly and it has a vertically extending slot 34 provided therein used to receive means to secure the gripper jaw assemblies to the carrier bars.

It particularly should be noted that the carrier bars 16 are of a predetermined box-like or closed channel shape and elongate slots or openings 36 and 38 are formed in the top and bottom of the carrier bar 16. The bar 16 may be of any conventional construction and these slots 36 and 38 extend over the center portion of the carrier bars but not for the full bar length, for a purpose to be hereinafter described. A top closure bar 39 is suitably welded to the channels forming the bar 16 at each lateral margin of the bar to close the slot 36.

In order to mount the individual gripper jaw means 22 in the carrier bars, but yet to provide lateral adjustment of these gripper jaw means on the carrier bars, suitable mounting means, particularly a pair of slides 40 and 42 are positioned in and are complementary in shape to the inner lateral contours of the channel shaped carrier bar 16. One of the slides 40 or 42 is positioned on each side of the upper portions of the control fingers 30 and gripper jaw means. The slides 40 and 42 engage the gripper jaw means by positioning rod or shaft 44 suitably engaging the slides 40 and 42 and extending therebetween through the slot 34 in the control rod 32 to retain the gripper jaw in engagement with such pair of slides for movement therewith. Normally the slides and bar 16 and the gripper jaws are made from a lubricated plastic or other material that slides readily in relation to the other. Thus, the gripper jaw means are mounted on the carrier bars for convenient lateral movement by any suitable means (not shown) to position the jaws to align with article rows in cases being processed.

When it is necessary to remove one of the gripper jaws for inspection or repair, or to assemble a gripper jaw on the carrier bar, the gripper jaw means 22 is moved laterally outwardly into alignment with slots or openings 46 provided in the laterally outer part of the bottom surface of the carrier bar. Such slots 46 are formed under the laterally inner ends of the closure bars 39. The slots 46 are of suitable length for the slides 40 and 42 to pass therethrough whereby the assembly of the pair of slides and individual gripper jaws can be inserted into the carrier bar or be removed therefrom, as desired. But for such action, the tops of the control fingers 30 and the control bar 32 must be pushed downwardly to slide under the closure bars and move the slides 40 and 42 over to the slot 46 for gripper jaw assembly removal. To engage the bar, the procedure must be reversed to thread the slides into engagement with the carrier bar. The gripper jaw can be slid along to a central portion of the carrier bar for article engaging and carrying action, as desired, and will retain a given position on the carrier bar 16. Normally the shaft 44 engages the top of the slot 38 to support the gripper jaw assembly with a shoulder 25 of the frame 24 resiliently abutting on the lower surface of the carrier bar. The fingers 30 and frame 24 can be forced downwardly in relation to the control bar 32 to change the gripper jaw position and open the jaws when desired.

While one complete embodiment of the invention has been disclosed herein, it will be appreciated that modification of this particular embodiment of the invention may be resorted to without departing from the scope of the invention.

What is claimed is:

1. A mounting assembly for gripper jaws in article casing and/or uncasing apparatus and comprising
    a carrier bar for extending transversely of a longitudinal axis of the apparatus and engaging a driving and positioning conveyor means for movement through a fixed course, said carrier bar having a bottom surface,
    a plurality of gripper jaw means operatively carried by and dependent from said carrier bar, and
    a pair of positioning members and a connecting shaft therefor for each of said gripper jaw means, said carrier bar being contoured to operatively engage and confine said members with said shaft engaging an individual gripper jaw means, and said carrier bar having a center slot in its bottom surface and an enlarged entrance and release opening connecting to said center slot for said members at a side area of said bottom surface.

2. A mounting assembly as in claim 1, where said gripper jaw means has a vertically extending slotted control bar extending up into said carrier bar, and each said shaft extends through a said slot in a said carrier bar.

3. A mounting assembly as in claim 2 wherein said carrier bar is of closed shape in vertical section, said gripper jaw means has vertically extending control fingers extending up into and through a center slotted portion of said carrier bar, and said control fingers are resiliently urged upwardly and are movable to positions below the top of said carrier bar.

4. A mounting assembly for gripper jaw means in article processing apparatus having a longitudinal axis and a driven conveyor means moved through a fixed longitudinally directed course and comprising
    a carrier bar extending transversely of the longitudinal axis of the article processing apparatus for engaging said driven conveyor means for movement through a fixed course,
    a plurality of gripper jaw means operatively engaging said carrier bar and extending above and below the same,
    a pair of positioning members for each of said gripper jaw means, said carrier bar having a generally closed box shape vertical section with a bottom surface and center openings in its upper and bottom surfaces extending over the center area of the bar and directed longitudinally of said carrier bar, said members being received in said bar on opposite sides of said gripper jaw means and being immediately adjacent thereto, and operably engaging a said gripper jaw means for movement therewith longitudinally of said carrier bars, said gripper jaw means including an upper shoulder area engaging said carrier bar, and a pair of vertically extending laterally spaced control fingers that extend vertically up through said carrier bar and the center openings thereof, said members being adjacent opposite faces of said control fingers, and
    a shaft securing each pair of said members together, which shaft extends through a portion of an associated gripper jaw means,
    said carrier bars each having a release slot in a lateral portion of said bottom surface connected to said bottom surface center opening spaced from the ends of said carrier bars to pass said members therethrough for gripper jaw means assembly and disassembly in relation to a said carrier bar.

5. A mounting assembly for gripper jaw means in article processing apparatus as in claim 4 and comprising said carrier bar engaging said driven means at both ends of said carrier bar for movement through a fixed course, and a cover means on each said carrier bar on the top thereof and positioned over a release slot therein, said control fingers being depressible to a level below said cover means.

6. A mounting assembly as in claim 1 and where said carrier bars have top and bottom surfaces and each said carrier bar has center slots in both its top and bottom surfaces at center portions thereof and said entrance and release openings are spaced laterally of said center slots, said gripper jaw means having control means extending through said center slots but being movable to a position below said top surface.

7. A mounting assembly as in claim 1 wherein said positioning members and carrier bar operatively engage said gripper jaw means to suspend a portion of said gripper jaw means from said carrier bar and to prevent any movement of said gripper jaw means as a unit in relation to said carrier bar except for movement said gripper jaw means along the said carrier bar.

8. A mounting assembly as in claim 1, and where said gripper jaw means is movable laterally of said carrier bar from an operable position at a center region of said carrier bar, and said positioning members are rollers, said gripper jaw means being initially engaged with said carrier bar by inserting said positioning members into said carrier bar through said opening and then being operably engaged with said carrier bar by moving the gripper jaw towards the center region of said carrier bar.

9. A mounting assembly as in claim 8 where said carrier bar is of closed shape in vertical section, said gripper jaw means has vertically extending control members extending up into and through a center slotted portion in the top of said carrier bar, and said control members are resiliently urged upwardly but are movable to positions below the top of said carrier bar to enable said control members and rollers to be moved up into engagement with said carrier bar at said opening; said top of said carrier bar extending over said opening.

* * * * *